United States Patent [19]

Borror et al.

[11] 4,264,704
[45] Apr. 28, 1981

[54] NOVEL XANTHENE DYE DEVELOPERS

[75] Inventors: Alan L. Borror, Lexington; Louis Cincotta, Andover; Edmond M. Mahoney, Billerica; Michael H. Feingold, Randolph, all of Mass.

[73] Assignee: Polaroid Corporation, Cambridge, Mass.

[21] Appl. No.: 143,438

[22] Filed: Apr. 24, 1980

Related U.S. Application Data

[63] Continuation-in-part of Ser. No. 32,876, Apr. 24, 1979, abandoned.

[51] Int. Cl.³ .................. G03C 1/40; G03C 7/00; G03C 5/54; G03C 1/10
[52] U.S. Cl. .................. 430/224; 430/242; 430/590
[58] Field of Search ............. 430/224, 390, 242, 559; 260/336, 335

[56] References Cited

U.S. PATENT DOCUMENTS

| | | | |
|---|---|---|---|
| 3,022,316 | 2/1962 | Bestian et al. | 260/336 |
| 3,687,678 | 8/1972 | Riester | 430/572 |

OTHER PUBLICATIONS

Venkataraman, *The Chemistry of Synthetic Dyes*, vol. VIII, Chapter VIII, 5/1978, pp. 331–387.

*Primary Examiner*—Richard L. Schilling
*Attorney, Agent, or Firm*—Gaetano D. Maccarone

[57] ABSTRACT

Novel xanthene dye developer compounds which include three or four silver halide developing groups are disclosed. Also described are photographic products and processes utilizing the dye developers.

20 Claims, 4 Drawing Figures

NOVEL XANTHENE DYE DEVELOPERS

CROSS REFERENCE TO RELATED CASES

This application is a continuation-in-part application of prior copending application Ser. No. 32,876, filed Apr. 24, 1979 and now abandoned.

BACKGROUND OF THE INVENTION

This application relates generally to novel compounds and, more particularly, to compounds which are useful as dye developers in photographic applications.

Multicolor images formed in accordance with the principles of substractive color photography typically employ yellow, magenta and cyan image forming dyes. The yellow dye ideally transmits only green and red light and absorbs only blue light. In like manner, the magenta ("minus green") dye ideally only absorbs green light and transmits only blue and red light, and the cyan ("minus red") dye ideally absorbs only red light and transmits only blue and green light. Unfortunately, the dyes which are available for use in substractive color photography are not "ideal" dyes, but tend to absorb some of the light that they ideally should transmit. This extra absorption results in less effective reproduction by the final image of one or more colors present in the original object.

This problem may be illustrated by considering the reproduction of green light: A multicolor photosensitive element, containing a blue-sensitive silver halide layer, a green-sensitive silver halide layer and a red-sensitive silver halide layer, said silver halide layers having associated therewith, respectively, a yellow image dye-providing material, a magenta image dye-providing material, and a cyan image dye-providing material, is exposed to blue light in an amount effective to fully expose the blue-sensitive layer. Only the blue-sensitive silver halide layer is exposed; the green-sensitive and red-sensitive silver halide emulsion layers remain unexposed. If such an exposed photosensitive element were processed by diffusion transfer techniques, the yellow image dye-providing material would remain in the developed photosensitive element (negative component) but magenta and cyan image dyes would be transferred to the image-receiving layer (positive component). Since the magenta and cyan image dyes are "minus green" and "minus red" respectively, the combination of magenta and cyan dyes appear blue, i.e., they transmit blue light to the viewer and absorb green and red, thus reproducing the blue record of the original subject.

From this illustration it will be readily apparent that if either the magenta or cyan image dyes also absorb blue light, the purity and quality of the "blue image" will be impaired. In the world of practical color photography, such unwanted absorption, sometimes referred to as "tail" absorption, is the rule rather than the exception. Magenta image forming dyes typically exhibit significant absorption in the blue region.

Accordingly, there is a continuing need for new image-forming dyes for use in photography. The copending patent application of Locatell et al, Ser. No. 32,888, filed Apr. 24, 1979, now abandoned and replaced by continuation-in-part application Ser. No. 143,284, filed Apr. 24, 1980, relates to xanthene compounds which may include two silver halide developing moieties, as well as photographic film products and photographic processes employing the xanthene compounds. The present application is drawn to novel magenta dye developer compounds which include three or four silver halide developing groups and which are useful as image forming materials in photography.

SUMMARY OF THE INVENTION

It is therefore the object of this invention to provide novel compounds.

It is another object to provide dye developers which are useful in photographic applications.

Another object is to provide magenta dye developers.

Still another object is to provide magenta dye developers which transmit a high proportion of incident blue light.

A further object is to provide magenta dye developers which exhibit good absorption of incident green light.

Yet another object is to provide novel photographic products and processes.

Still another object is to provide novel diffusion transfer photographic products and processes.

BRIEF SUMMARY OF THE INVENTION

These and other objects and advantages are accomplished in accordance with the invention by providing novel compounds which are represented by the structural formula:

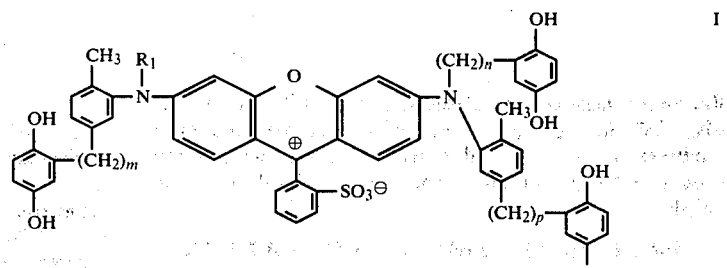

where $R_1$ may be —$CH_3$ or

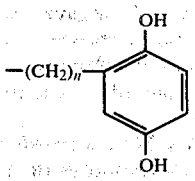

m, n and p may be the same or different and each is an integer of from 1 to 5. In a preferred embodiment of the invention $R_1$ is —$CH_3$ and m, n and p are each 3.

It should be noted that the resonance form of the chromophoric system represented by Formula I also may be represented as follows:

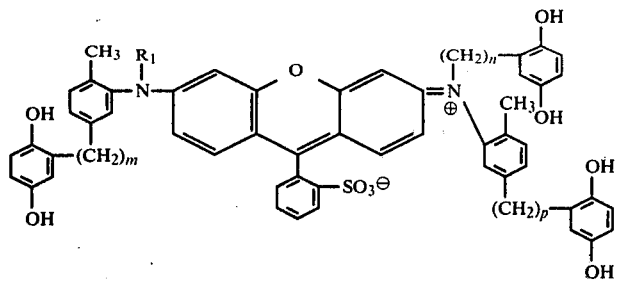

It should be understood that both resonance forms of the chromophoric system are intended to be encompassed by Formula I.

These novel compounds are magenta dyes and, as is shown by the structural formula, include three or four silver halide developing groups. The dye developers of the invention exhibit good absorption of incident green light and transmit a high proportion of incident blue light.

BRIEF DESCRIPTION OF THE DRAWINGS

For a better understanding of the invention as well as other objects and further features thereof, reference is made to the following detailed description of various preferred embodiments thereof taken in conjunction with the accompanying drawings wherein.

DESCRIPTION OF THE PREFERRED EMBODIMENTS

The preferred magenta dye developers of the invention are represented by the formulas:

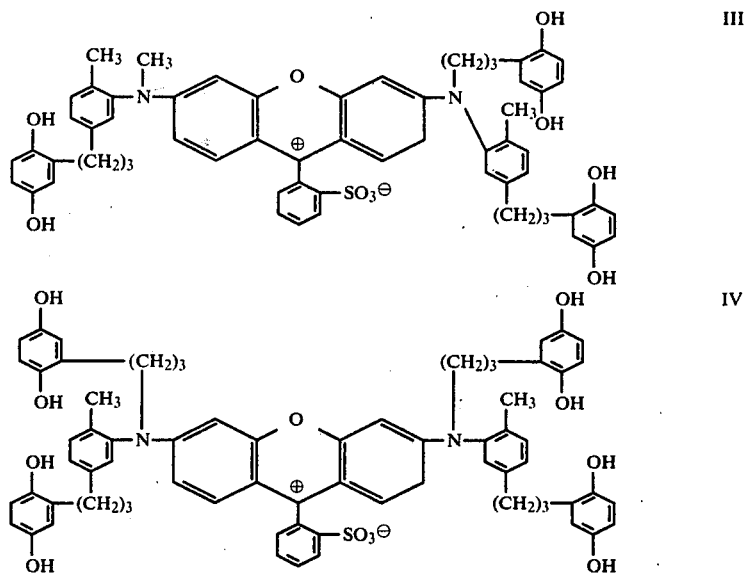

Figure 1:
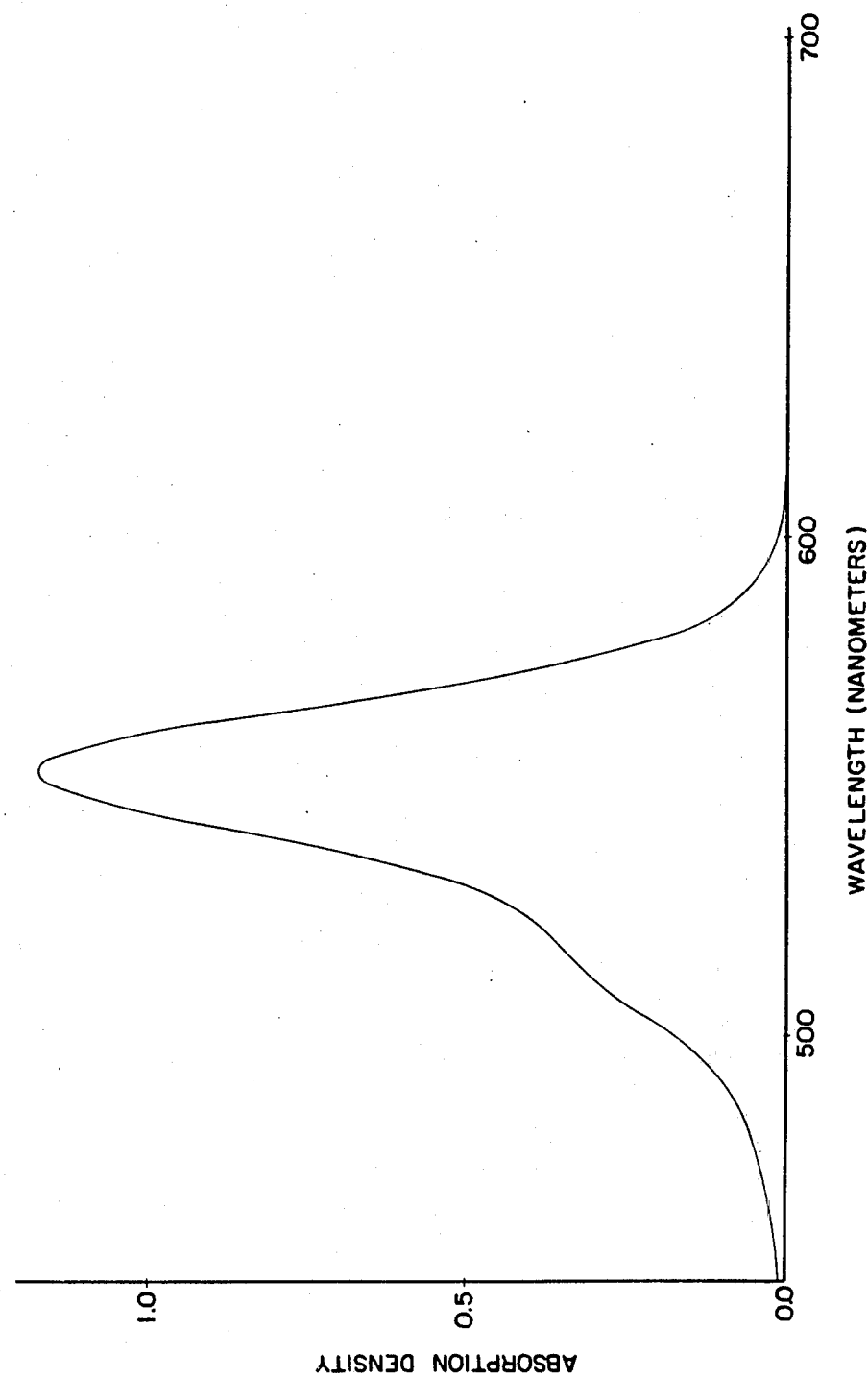
FIG. 1 is the absorption spectrum of one of the preferred dye developers of the invention.

The dye developers of the invention typically exhibit desirable absorption characteristics. FIG. 1 illustrates the absorption spectrum of dye developer III as obtained from a $1 \times 10^{-5}$ molar solution in methyl cellosolve. The dye developers exhibit transmission characteristics in the blue region of the spectrum which provide desirable bright blues in the final photographic print.

The dye developers of the invention may be prepared, for example, by initially reacting dichlorosulfone fluoroescein with a compound represented by the formula:

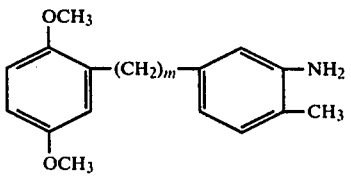

wherein m is as previously defined, to form a dye represented by the formula:

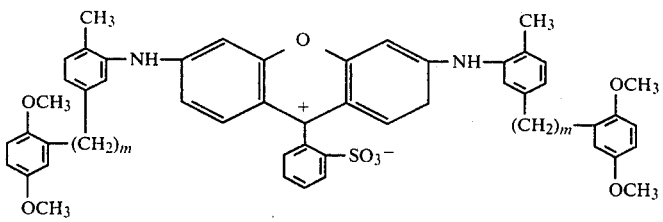

The dye can then be reacted with a compound represented by the formula

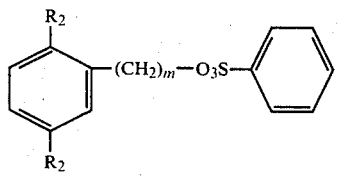

wherein R$_2$ is

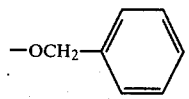

or —OCH$_3$ to attach a blocked silver halide developer group to one or both of the nitrogen atoms. Where a blocked silver halide developer group is attached to only one nitrogen atom the other nitrogen atom is methylated by reaction with a methylating agent such as methyl iodide. Generally, more vigorous reaction conditions are used when it is desired to attach a blocked silver halide developer group to both nitrogen atoms. The dyes can then be converted to dye developers by reaction with boron tribromide in a known manner.

A process for preparing the dye developers of the invention is described in copending application Ser. No. 32,881 filed Apr. 24, 1979.

Figure 2:
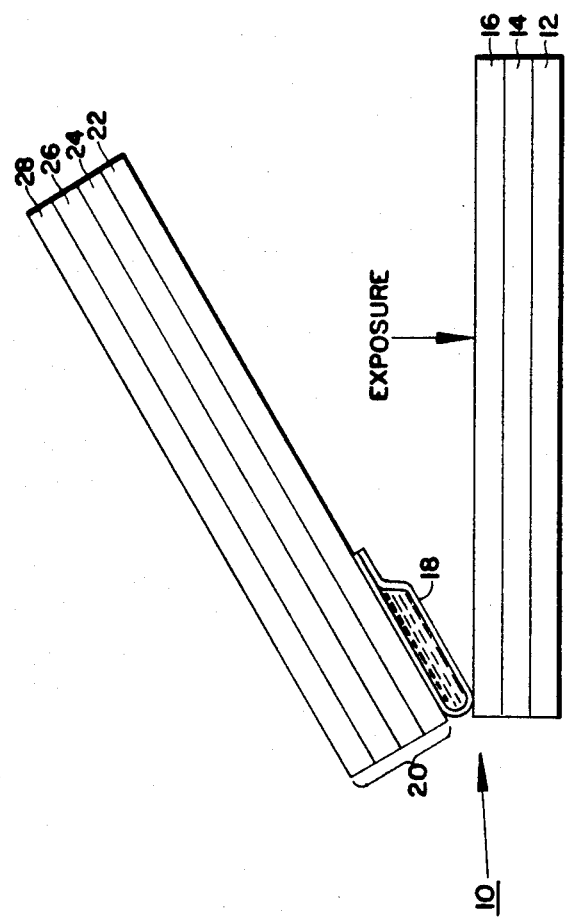
FIG. 2 is a partially schematic, cross-sectional view of one embodiment of a film unit according to the invention especially suited for the formation of a monochromatic image.

The dye developers of the present invention may be utilized in any film unit which is useful in monochromatic or multicolor photography. Particularly preferred film units according to the present invention are those diffusion transfer integral negative-postive film units of the type described in detail in U.S. Pat. Nos. 3,415,644, 3,594,165 and 3,647,437. Other preferred film units are those which are designed to be separated after processing such as those described in U.S. Pat. No. 2,983,606. The entire disclosure of each of the four patents listed above is hereby incorporated by reference herein. Extensive discussion of the film units of the invention is not required in view of the state of the art. However, for the purposes of illustration the invention will be further described with respect to a monochromatic film unit. Referring now to FIG. 2 there is seen the monochromatic film unit, generally designated 10, which comprises a conventional paper or plastic film support 12, a layer 14 containing a magenta dye developer according to the invention, and a photosensitive layer 16 comprising a suitable silver halide emulsion. Container 18 includes a viscous processing reagent and may be formed of a composite sheet material comprising an inner layer which is substantially chemically inert to the processing reagent, an intermediate layer which is substantially impervious to vapor and an outer backing layer which can be readily affixed to a layer of the film assembly such as, for example, the print receiving element 20. The print receiving element comprises a dyeable material and may comprise a single print receiving layer or a composite structure as shown made up of image-receiving layer 22, spacer layer 24, polymeric acid layer 26 and transparent support 28. In practice, the film unit is employed with any suitable photographic camera apparatus and is exposed to provide a negative latent image. Processing of the film unit typically occurs by bringing the exposed portion of the unit in superposed relation with a portion of the print receiving element 20 while drawing these portions of the unit between a pair of pressure rollers which rupture container 18 and spread the processing composition contained thereon between and in contact with the photosensitive layer and the corresponding area of the print receiving element. The processing composition permeates or migrates into the photosensitive layer 16 and dye developer layer 14. During the permeation of the processing composition into layer 14 dye developer contained in the layer is dissolved in the processing composition and is transported in solution into photosensitive layer 16 to distribute dye developer in the photosensitive layer. Where development occurs the dye developer is oxidized as a function of the amount of silver halide reduced to silver while the oxidation product of the dye developer forms an image that is substantially coextensive with the developed silver. The dye developer provides an oxidation product as a result of silver development which is of considerably lower solubility in the processing composition than the dye developer itself. Under these conditions the oxidation product is substantially immobilized or retained in the photosensitive layer 16.

At the time that the dye developer is interacting with exposed silver halide and providing an immobile oxidation product, an imagewise distribution of unoxidized dye developer is formed in the negative material in areas where exposure and subsequent development are less than complete. Dye developer present in solution in this imagewise distribution is transportable at least in part by imbibition to print receiving element 20. Thus, the print receiving element is dyed or otherwise colored by the transported dye developer where the dye developer is deposited to provide the desired reverse image in color of the latent image. In this instance the transfer or positive image is magenta. After formation of the positive image the print receiving element is separated from the photosensitive element.

Experiments indicate that there does not appear to be any significant difference in the transfer characteristics of a xanthene dye developer having two silver halide developing groups which is represented by the structural formula

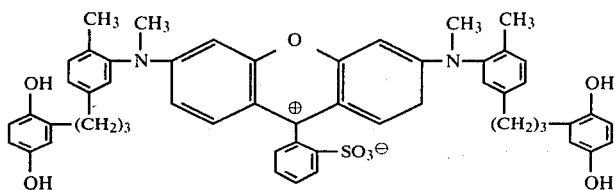

V and which is disclosed in the Locatell et al application referred to above and the three-and four silver halide developer group xanthene dye developers of the present invention when employed in monochromatic diffusion transfer photographic film units. However, when these dye developers are incorporated as the magenta dye developer in multicolor integral negative-positive diffusion transfer photographic film units which also include yellow and cyan dye developers, experiments have shown that in some instances the three-and four silver halide developer group dye developers transfer to the image receiving element more effectively than the two silver halide developer group dye developer compound V illustrated above.

Examples VIII–XVI describe a series of experiments wherein dye developer III of the present invention and dye developer V of the Locatell et al. application were compared in various multicolor diffusion transfer photographic systems which also included yellow and cyan dye developers. The results show that dye developer III exhibits a significantly faster transfer rate in these multicolor photographic systems. It is also evident that while dye developer V is capable of providing a useful level of final green density, dye developer III provides a desired level of final green density in a considerably shorter time so that activation of a neutralization or pH reduction system need not be delayed. The results also show that the rate of transfer of dye developer III is essentially unaffected by the type of photographic system involved. On the other hand the rate of transfer of dye developer V in multicolor diffusion transfer photographic systems appears to be affected by various factors such as the presence of phthalein opacifying dyes and the timing of neutralization. Experiments have shown that dye developer compounds of the present application having four developer moieties behave generally in the same manner as those having three developer moieties.

The invention will now be described further in detail with respect to specific preferred embodiments by way of examples, it being understood that these are illustrative only and the invention is not intended to be limited to the materials, conditions, process parameters, etc., recited therein. All parts and percentages are by weight unless otherwise indicated.

EXAMPLE I

A. PREPARATION OF A DIMETHOXY INTERMEDIATE 6.72 liters of concentrated sulfuric acid were placed in a 20 liter three neck flask and cooled to −30° C. in a dry ice-acetone bath. To this was added p-methylacetophenone (3 kg, 22.35 m) with stirring at a rate that kept the temperature at less than 30° C. After addition of the p-methylacetophenone, the temperature was allowed to drop to −15° C. and a mixture of 2.69 liters of concentrated sulfuric acid and 1.77 liters of concentrated nitric acid (d=1.42), pre-cooled to 0° C., was added rapidly with stirring. The temperature of the reaction mixture was maintained at −15° C. by frequent additions of crushed ice directly to the reaction flask. When all the nitrating acids were added, the dry ice bath was removed and the mixture was stirred for 15 minutes with the temperature not being allowed to exceed −10° C. A viscous reaction mixture was obtained and it was poured onto ice with stirring. The product was collected by filtration, washed well with water and pressed dye as possible. The damp filter cake was stirred in 6 liters of absolute ethanol, precooled to 0° C., and recovered by filtration. The solid was pressed dry and then air dried to give 3.8 kg of 3-nitro-4-methylacetophenone

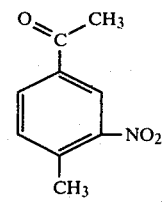

A mixture containing 3.67 kg (20.5 m) of the 3-nitro-4-methylacetophenone and 3.4 kg (20.5 m) of dimethoxybenzaldehyde in 9 liters of ethanol was stirred and saturated with gaseous HCl through a sintered glass gas diffuser tube. The resulting exotherm was sufficient to bring about solution of the reactants at reflux and reflux temperature was maintained for five hours. The product was allowed to crystallize overnight at room temperature with agitation. The resulting yellow crystalline solid was filtered and washed well with ethanol until the filtrate was light yellow. Air drying gave 5.7 kg (85% yield) of bright yellow crystals of 3-nitro-4-methyl-2′,4′-dimethoxychalcone

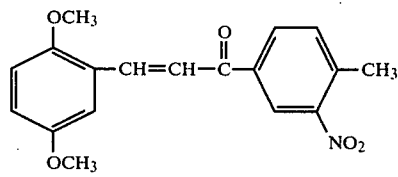

A hydrogenator was charged with 1.32 kg of the chalcone, 9 liters of acetic acid, 450 g of acetic anhydride and 132 g of 10% palladium on carbon catalyst. The hydrogenator was evacuated, charged with hydrogen and the chalcone was hydrogenated at 115° C. and 100 psi until hydrogen uptake was completed (about 18 hours). The hydrogen was then evacuated off, the reactor flushed with nitrogen and the catalyst filtered off. The reaction mixture was precipitated into about 15 gallons of cold water after which the resulting white solid was collected by filtration, washed with water, air dried and then recrystallized from ethanol/water (2:1 v/v)

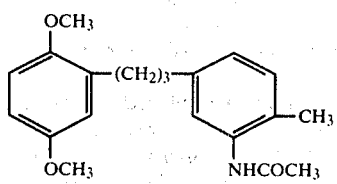

A mixture of 893 g (2.73 m) of the amide in 2 liters of ethanol and 900 ml of concentrated HCl was heated at reflux on a steam bath with stirring for 8 hours. The solution was cooled to room temperature, filtered and poured slowly into a stirred solution containing about 5 liters of crushed ice and 2 liters of 45% potassium hydroxide. The precipitate was collected by filtration, washed well with water and dried under vacuum to give 762 g (98% yield) of a white powder

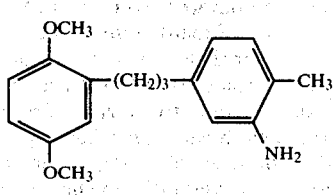

B. PREPARATION OF A DYE

A mixture containing 4.05 g (0.010 m) of 3,6-dichlorosulfonefluoran, 11.5 g (0.040 m) of the dimethoxy intermediate and 70 ml of diglyme was heated at reflux (162° C.) under a nitrogen atmosphere for 10 hours. The resulting deep magenta solution was allowed to cool overnight, filtered and the product washed with ether. A fine red powder (6.3 g, 70% yield) was obtained. TLC on K5F plates on 77/23 ethylacetate/ethanol (v/v) showed the desired product

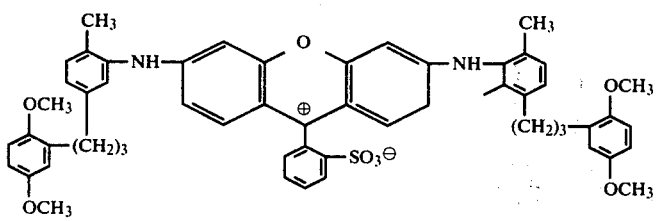

C. PREPARATION OF A TOSYLATE

A tosylate compound which is represented by the structural formula

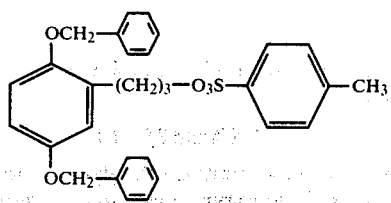

was prepared as follows:
To a 3 liter, 3-neck flask containing a mechanical stirrer, addition funnel and nitrogen inlet tube there was added, under nitrogen atmosphere, 500 ml of anhydrous ether and 5.0 g (0.146 m) of 95% LiAlH$_4$ powder. To the stirred suspension there was added dropwise over a 30 minute period a solution of 48.2 g (0.124 m) of a compound represented by the formula

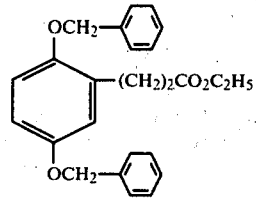

in 250 ml of ether. The mixture was stirred for two hours and let stand overnight. To the stirred mixture there was added dropwise, slowly, 5 ml of water, 5 ml of 15% NaOH and 15 ml of water. The white precipitate was collected by filtration and washed well with ether. The filtrate was dried over anhydrous Na$_2$SO$_4$ filtered to remove the Na$_2$SO$_4$ and evaporated under reduced pressure to yield a thick oil. On further drying under high vacuum, the oil crystallized to yield 40 g (93% yield) of a white solid, m.p. 38°-39° C., represented by the formula

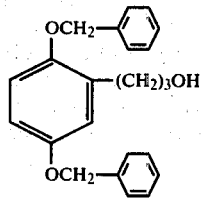

To a 1 liter flask there were added, under a nitrogen atmosphere, 80.0 g (0.23 m) of the previous product and 500 ml of dry pyridine. To the stirred solution, cooled to 3° C., there was added p-toluenesulfonyl chloride (50 g, 0.26 m) and the reaction mixture stirred for 2¾ hours in an ice bath. TLC on silica gel plates, eluting with 1:4 (by volume) acetone-petroleum ether showed that the reaction was not progressing any further. Water (10 ml) was added to the solution which was stirred for 10 minutes and then poured into 3 liters of water. The mixture was extracted with 1000 ml of ether, the ether layer separated, washed several times with dilute HCl solution and the ether layer dried over anhydrous Na$_2$SO$_4$. The ether was evaporated under reduced pressure to give 115 g of a viscous oil represented by the formula

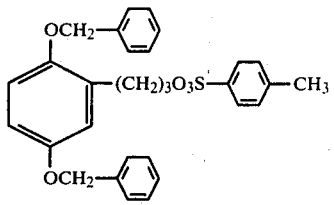

NMR spectrum of this oil showed it to be approximately 75% pure with the starting material being the remainder. The oil was used without further purification.

D. PREPARATION OF DYE DEVELOPER (III)

10 g of the dye prepared in part B was suspended in 75 ml of dimethyl sulfoxide at room temperature under nitrogen gas. To this was added 1.8 g of a 50% sodium hydride dispersion in oil and the mixture stirred for thirty minutes at room temperature. A blue solution developed. To this solution was added 10 g of the tosylate prepared in part C and the solution was stirred for three hours at room temperature. TLC on silica gel with 5/95 methanol/methylene chloride, by volume, showed that none of the dye intermediate remained. Methyl iodide (2 ml) was added and the mixture was stirred for one hour. TLC showed that the reaction was complete. The reaction mixture was poured into 1 liter of water containing 1 ml of conc. HCL and the precipitate was filtered off. The precipitate was placed back into water, stirred well, collected by filtration and vacuum dried to give 14.0 g. The product was dissolved in 400 ml of methylene chloride and 125 g of silica gel added to the solution. The stirred mixture was placed in a sintered glass funnel and filtered while washing with methylene chloride. The dye was removed with 5/95 methanol/methylene chloride, by volume, and evaporated to dryness. The dye is represented by the structural formula washed well with methylene chloride and vacuum dried at 80° C. to give 9.0 g of solid. The solid was dissolved in methanol containing several drops of conc. HCl, refluxed, and poured into 1000 ml of ether. The precipitate was collected by filtration and dried to give 3.8 g of product.

The 3.8 g. sample was placed on 60 g. of sea sand with methanol. The mixture was placed in a steel column and an additional 250 g. of sea sand were added. The column was placed on line on a high pressure chromatography unit and washed with a succession of solvents as follows (parts are by volume):

1 liter methylene chloride
2 liters 1/99 methanol/methylene chloride
4 liters 2/98 methanol/methylene chloride
4 liters 3/97 methanol/methylene chloride
3 liters 4/96 methanol/methylene chloride
12 liters 5/95 methanol/methylene chloride
3 liters 6/94 methanol/methylene chloride The appropriate solvent fractions as determined by thin layer chromatography were collected and evaporated to give 1.8 g of the dye developer.

TLC of the material showed traces of impurities. The sample was again placed on 60 g. of sea sand and placed back in the steel column (which was first washed with 9/91 methanol/methylene chloride, by volume, and then with methylene chloride). The column was washed with a succession of solvents as follows (parts are by volume):

1 liter methylene chloride
3 liters 2/98 methanol/methylene chloride
3 liters 3/97 methanol/methylene chloride
1 liter 4/96 methanol/methylene chloride
10 liters 4/96 methanol/methylene chloride
3 liters 6/94 methanol/methylene chloride The appropriate solvent fractions as determined by thin layer chromatography were collected and evaporated to give 1.7 g of the dye developer which was shown to be pure by TLC. The product exhibited maximum absorption in methyl cellosolve at 553 nm, $\epsilon = 117,500$. An

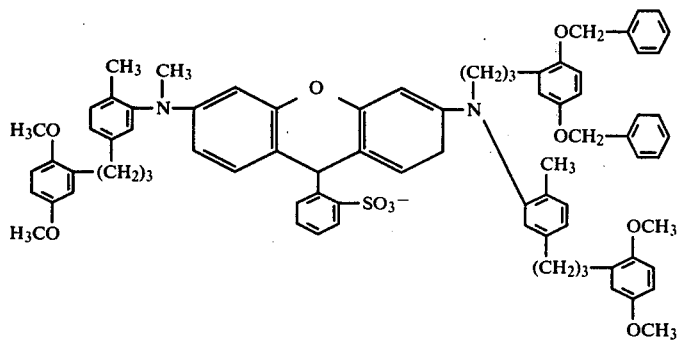

To a stirred solution of 15 ml of boron tribromide in 500 ml of methylene chloride, under nitrogen and cooled to 5° C., there was added dropwise a solution of 5.0 g of the dye in 100 ml of methylene chloride over a 45 minute period. The magenta solution was allowed to warm to room temperature. TLC on silica gel showed two spots. A sample of the solution was heated to reflux with no apparent change in the TLC results. Water was added dropwise to the solution and a magenta precipitate formed. The precipitate was collected by filtration, NMR spectrum of the dye developer confirmed the structure.

EXAMPLE II

To illustrate the utility of the dye developers of the invention in photographic applications a film unit of the type illustrated in U.S. Pat. No. 3,415,644 was prepared. The negative element of the film unit included: a cyan dye developer layer comprising 747 mg/m² of a cyan dye developer represented by the structural formula

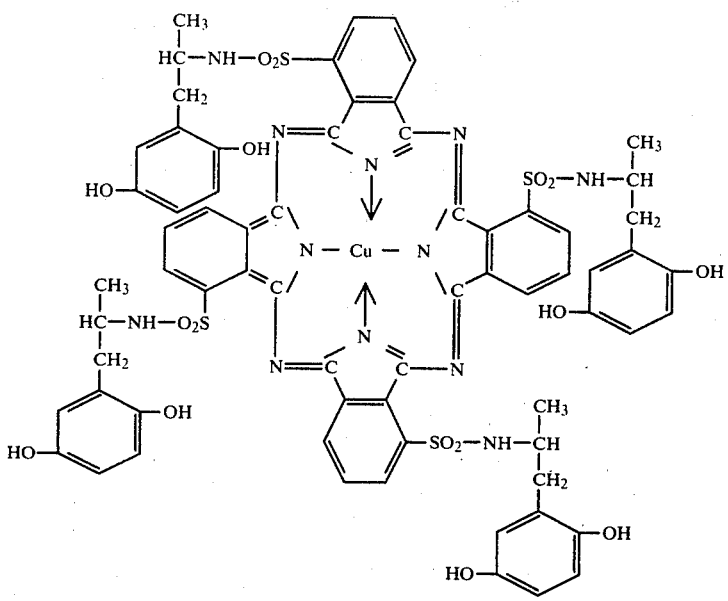

and 67.8 mg/m² of 4'-methyl phenyl hydroquinone; a red sensitive gelatino silver iodobromo emulsion layer; an interlayer of a tetrapolymer of butylacrylate, diacetone acrylamide, styrene and methacrylic acid and including polyacrylamide; a magenta dye developer layer comprising 484 mg/m² of a dye developer of the invention (compound III) prepared by the procedure described in Example 1, a green sensitive silver iodobromo emulsion layer; an interlayer similar to that described above and also containing succindialdehyde; a yellow dye developer layer comprising 968 mg/m² of a yellow dye developer represented by the structural formula

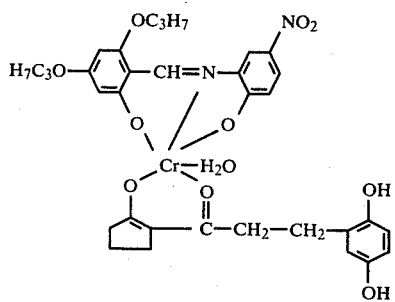

a blue sensitive gelatino silver iodobromo emulsion layer; and an overcoating layer.

The image receiving element comprised a 4 mil thick polyethylene terephthalate photographic film base with the following layers coated thereon in succession:

1. as a polymeric acid layer approximately 9 parts of a ½ butyl ester of polyethylene/maleic anhydride copolymer and 1 part of polyvinyl butyral coated at a coverage of about 2450 mgs/ft² (26,371.6 mgs/m²);
2. a timing layer containing about 425 mgs/ft² (4574.7 mgs/m²) of a 60-30-4-6 tetrapolymer of butylacrylate, diacetone acrylamide, styrene and methacrylic acid including 9% polyvinyl alcohol; and
3. a polymeric image receiving layer of: (a) 3 parts of a mixture of 2 parts polyvinyl alcohol and 1 part poly-4-vinyl pyridine and (b) 1 part of a graft copolymer comprised of 4-vinylpyridine (4VP) and vinylbenzyl trimethyl ammonium chloride (TMQ) grafted onto hydroxyethyl cellulose (HEC) at a ratio of HEC/4VP/TMQ of 2.2/2.2/1 coated at a coverage of about 300 mgs/ft² (3229.2 mgs/m²).

The film unit was processed with a processing composition comprised of:

|  | GMS/100cc H₂O |
|---|---|
| Water | 100cc |
| Titanium Dioxide | 76.9 |
| Carboxymethyl hydroxyethyl cellulose | 4.06 |
| Potassium hydroxide | 10.1 |
| N-Hydroxyethyl-N,N',N'-tris-carboxymethyl ethylene diamine | 1.52 |
| Polyethylene glycol | 0.91 |
| Benzotriazole | 1.12 |
| 4-aminopyrazolo-(3,4d) pyrimidine | 0.51 |
| 2-(benzimidazolyl methyl) sulfide | 0.04 |
| 6-methyl uracil | 0.61 |
| Colloidal silica | 1.12 |
| N-phenethyl-α-picolinium bromide | 2.58 |
| 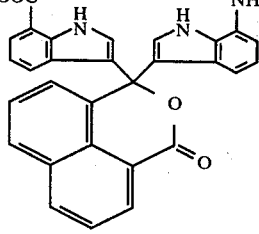 | 0.61 |

-continued

| | GMS/100cc H₂O |
|---|---|
| [structure shown below] | 2.71 |

[Structure: naphthalene-based compound with OH groups, COOH HOOC, C₁₈H₃₇O substituent, and a lactone ring with C=O]

The film unit then was exposed (2 meter-candle-seconds) on a sensitometer to a test exposure scale, or step wedge, through a 0.6 neutral density filter, and passed through a pair of rollers at a gap spacing of about 0.0030 inch. The film unit was kept intact and viewed through the base. There was obtained a well developed dye image. The reflection densities of the neutral area of the image were:

| | Red | Green | Blue |
|---|---|---|---|
| $D_{max}$ | 2.11 | 2.08 | 1.95 |
| $D_{min}$ | 0.21 | 0.23 | 0.21 |

EXAMPLE III

A mixture containing 1.5 g. (15.6 mmole) of potassium tertiary butoxide in 45 ml of diglyme was heated to 90° C. in a nitrogen atmosphere. To the mixture was added 4.5 g. (5 mmole) of the dye as described in Example IB which resulted in the immediate formation of a deep blue solution. After stirring at 90° C. for an additional 10 minutes, 5.25 g. (15 mmole) of a tosylate compound represented by the structural formula

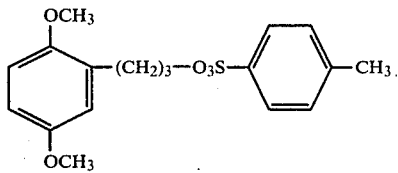

was added. The resulting magenta solution was stirred and heated at 90° C. for 8 hours, cooled to room temperature, filtered and poured over a slurry of crushed ice and dilute hydrochloric acid. The product was filtered and washed with ice water. The initially flocculent magenta dye tended to become gummy upon washing with warm water and upon exposure to air. A crystalline dye product was obtained by dissolution of the gummy material in methylene chloride, drying over sodium sulfate and precipitation into ether.

Thin layer chromatography of the crude blocked dye using 90/10 chloroform/methanol (vol/vol) showed the product at $R_f$=4 cm with small amounts of two gray by-products at $R_f$=0.5 cm and 1.5 cm. Trace amounts of low $R_f$ magenta dyes were also noted, the most significant of which had $R_f$=2 cm.

A solution containing 5.5 g. (4.4 mmole) of the blocked dye in 30 ml of methylene chloride was added dropwise to a solution containing 26.4 g. (105 mmole) of boron tribromide in 25 ml of methylene chloride. The resulting solution was brought to reflux for 15 minutes and then allowed to cool. The dye developer was isolated by careful dropwise addition of 30 ml of methanol followed by pouring the resulting solution over crushed ice. The dye developer was filtered, washed with water and dried to give 4.8 g. The dye developer exhibited maximum absorption in methyl cellosolve at 557 nm, $\epsilon$=97,500. An NMR spectrum of the dye developer supported the above structure.

EXAMPLE IV

A film unit was prepared as follows: the negative element was made up of a polyethylene terephthalate photographic film base with the following layers coated thereon in succession:
1. a magenta dye developer layer at a coverage of 32 mgs/ft² (344.4 mgs/m²) of dye developer IV dispersed in 32 mgs/ft² (344.4 mgs/m²) of cellulose acetate hydrogen phthalate;
2. a green sensitive gelatino silver iodobromo emulsion coated at a coverage of 75 mgs/ft² (807.3 mgs/m²) of silver and 88 mgs/ft² (947.2 mgs/m²) of gelatin;
3. a layer of 30 mgs/ft² (322.9 mgs/m²) of gelatin.

The image-receiving element comprised a transparent polyethylene terephthalate photographic film base with the following layers coated thereon in succession:
1. as a polymeric acid layer, approximately 9 parts of a half-butyl ester of polyethylene/maleic anhydride copolymer and 1 part of polyvinyl butyral coated at a coverage of about 2600 mgs/ft² (27,986 mgs/m²) and including an ultraviolet absorbing material;
2. a timing layer containing about 450 mgs/ft² (4843.8 mgs/m²) of a 60-30-4-6 tetrapolymer of butyl acrylate, diacetone acrylamide, styrene and methacrylic acid including about 7%–8% polyvinyl alcohol; and
3. a polymeric image-receiving layer of: (a) 3 parts of a mixture of 2 parts polyvinyl alcohol and 1 part poly-4-vinylpyridine and (b) 1 part of a graft copolymer comprised of 4-vinylpyridine (4VP) and vinylbenzyl trimethyl ammonium chloride (TMQ) grafted onto hydroxyethyl cellulose (HEC) at a ratio of HEC/4VP/TMQ of 2.2/2.2/1 coated at a coverage of about 300 mgs/ft² (3229.2 mgs/m²).

The film unit was processed with a processing composition comprised of:

| | |
|---|---|
| Water | 1757 gms |
| Bis- (β-aminoethyl) - sulfide | 1.04 cc |
| Titanium dioxide | 2028 gms |
| Potassium hydroxide (50% solution) | 380.3 gms |
| Carboxymethyl hydroxyethyl cellulose | 51.8 gms |
| Benzotriazole | 26.9 gms |
| 6-methyluracil | 14.2 gms |
| N-Hydroxyethyl-N,N',N'-tris-carboxymethyl ethylene diamine | 40.2 gms |
| 6-methyl-5-bromo-4-azabenzimidazole | 1.34 gms |
| 6-benzylaminopurine | 19.0 gms |
| Lithium nitrate | 4.72 gms |
| Polyethylene glycol (MW 6000) | 26.1 gms |
| Colloidal silica (50% aqueous dispersion) | 88.5 gms |
| N-benzyl-α-picolinium bromide (50% solution) | 121.3 gms |
| N-phenethyl-60 -picolinium bromide (50% solution) | 70.0 gms |

The film unit was exposed (2 meter-candle-seconds) on a sensitometer to a test exposure scale with green and blue light and then passed through a pair of rollers at a gap spacing of about 0.0020 inches. The unit was allowed to remain in the dark for about 10 minutes. The film unit was kept intact and maximum and minimum reflection densities were measured. The resulting image had a $D_{max}/D_{min}=2.09/0.69$.

EXAMPLE V

The procedure of Example IV was repeated with the exception that the dye developer layer of the negative element was made up of 28.0 mgs/ft$^2$ (301.4 mgs/m$^2$) of dye developer III and 28.0 mgs/ft$^2$ (301.4 mgs/m$^2$) of cellulose acetate hydrogen phthalate. The resulting image had a $D_{max}/D_{min}=2.03/0.64$.

EXAMPLE VI

The procedure of Example V was repeated with the exception that the gelatin layer of the negative element also included 7.5 mgs/ft$^2$ (80.7 mg/m$^2$) of methylphenyl hydroquinone. The resulting image had a $D_{max}/D_{min}=2.20/0.25$.

EXAMPLE VII

The procedure of Example IV was repeated with the exception that the gelatin layer of the negative element also included 7.5 mgs/ft$^2$ (80.7 mgs/m$^2$) of methylphenyl hydroquinone. The resulting image had a $D_{max}/D_{min}=2.00/0.22$.

EXAMPLES VIII–XVI

A series of experiments were conducted in order to compare the relative photographic performance, in various different diffusion transfer photographic systems, of dye developer III of the present invention and dye developer V which is disclosed and claimed in the Locatell et al. application.

EXAMPLE VIII

This example compares the relative photographic performance of the respective dye developers in an integral positive-negative photographic diffusion transfer process using a processing composition which includes opacifying dyes.

PREPARATION OF THE FILM UNITS

A film unit (Film Unit A) was prepared as follows: The negative element comprised an opaque subcoated polyethylene terephthalate film based on which the following layers were coated in succession:
(1) a layer of sodium cellulose sulfate coated at a coverage of about 21 mgs./m.$^2$;
(2) a cyan dye developer layer comprising about 635 mgs./m.$^2$ of a cyan dye developer represented by the formula

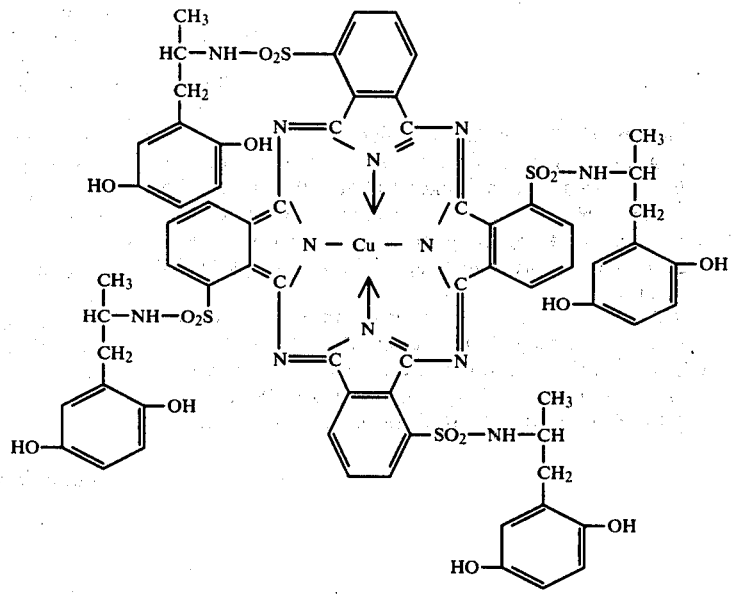

about 429 mgs./m.$^2$ of gelatin, about 238 mgs./m.$^2$ of dodecylaminopurine and about 128 mgs./m.$^2$ of 4' methyl phenyl hydroquinone;
(3) a red sensitive gelatino silver iodobromide (1.8 microns) emulsion layer coated at a coverage of about 1900 mgs./m.$^2$ of silver and about 1140 mgs./m.$^2$ of gelatin;
(4) an interlayer comprising about 2000 mgs./m.$^2$ of a 60-30-4-6 tetrapolymer of butylacrylate, diacetone acrylamide, styrene and methacrylic acid and about 30 mgs./m.$^2$ of polyacrylamide;
(5) a magenta dye developer layer comprising about 666 mgs./m.$^2$ of magenta dye developer III, about 323 mgs./m.$^2$ of gelatin and about 150 mgs./m.$^2$ of dodecylaminopurine;
(6) a green sensitive silver iodobromide (1.11 microns) emulsion layer coated at a coverage of about 700 mgs./m$^2$ of silver and about 308 mgs./m.$^2$ of gelatin;
(7) a green sensitive silver iodobromide (1.8 microns) emulsion layer coated at a coverage of about 600 mgs./m$^2$ of silver and about 288 mgs./m.$^2$ of gelatin;
(8) an interlayer comprising about 1380 mgs./m$^2$ of a 60-30-4-6 tetrapolymer of butylacrylate, diacetone acrylamide, styrene and methacrylic acid and about 30 mgs./m.$^2$ of polyacrylamide;
(9) a spacer layer comprising about 285 mgs./m.$^2$ of 2-phenylbenzimidazole and about 142.5 mgs./m.$^2$ of gelatin;

(10) a yellow dye developer layer comprising about 820 mgs./m.² of a yellow dye developer represented by the formula

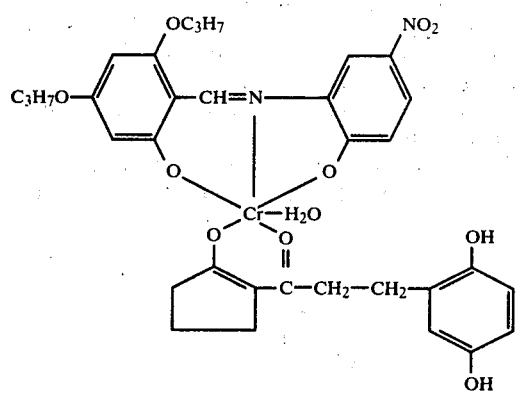

and about 328 mgs./m.² of gelatin;

(11) a blue sensitive silver iodobromide (1.5 microns) layer coated at a coverage of about 1050 mgs./m² of silver, 660 mgs./m² of gelatin and about 306 mgs./m.² of 4'-methyl phenyl hydroquinone; and

(12) an overcoat layer made up of about 484 mgs./m.² of gelatin.

The image-receiving element comprised a transparent subcoated polyethylene terephthalate film base on which the following layers were coated in succession:

(1) as a polymeric acid layer approximately 9 parts of a ½ butyl ester of polyethylene/maleic anhydride copolymer and 1 part of polyvinyl butyral coated at a coverage of about 2450 mgs./ft² (26,372 mgs./m.²);

(2) a timing layer coated at a coverage of about 270 mgs./ft² (2906 mgs./m² of a 60-30-4-6 tetrapolymer of butylacrylate, diacetone acrylamide, styrene and methacrylic acid and about 30 mgs./ft² (323 mgs./m²) of polyvinyl alcohol;

(3) a polymeric image-receiving layer coated at a coverage of about 10 mgs./ft² (108 mgs./m.²) of 1,4-butanediol diglycidyl ether and about 300 mgs./ft² (3229 mgs./m.²) of: (a) 3 parts of a mixture of 2 parts polyvinyl alcohol and 1 part poly-4-vinyl pyridine and (b) 1 part of a graft copolymer comprised of 4-vinyl pyridine (4VP) and vinyl benzyl trimethyl ammonium chloride (TMQ) grafted onto hydroxyethyl cellulose (HEC) at a ratio HEC/4VP/TMQ of 2.2/2.2/1; and (4) a topcoat layer of polyvinyl alcohol coated at a coverage of about 40 mgs./ft² (430 mgs./m²).

A second film unit (Film Unit B) was prepared which was identical to Film Unit A with the exception that in the negative element the magenta dye developer layer included about 540 mgs./m² of dye developer V instead of dye developer III.

The amounts of dye developer III and V respectively present in Film Units A and B were chosen so as to provide substantially equivalent molar amounts of the dye developers. Thus 659×10⁻⁵ mole of dye developer III (MW 1011) and 617×10⁻⁵ mole of dye developer V (MW 875) were present in the respective film units.

PROCESSING OF THE FILM UNITS

Film units A and B were processed with a processing composition made up as follows:

| | |
|---|---|
| Water | 1622 ml. |
| TiO₂ | 2312.0 grams |
| Oximated polydiacetone acrylamide | 32.0 " |
| Potassium hydroxide (45% solution) | 486.6 " |
| Benzotriazole | 22.0 " |
| 4-Aminopyrazolo-(3,4d) pyrimidine | 10.0 " |
| 6-Methyl uracil | 12.0 " |
| N-hydroxyethyl-N,N',N'-tris-carboxymethyl ethylene diamine | 30.0 " |
| Polyethylene glycol (M.W. 4000) | 18.0 " |
| Bis(2-aminoethyl)sulfide | 0.8 " |
| Colloidal silica (30% solids) | 37.0 " |
| N-phenethyl-α-picolinium bromide (50% solids) | 102.0 " |
| 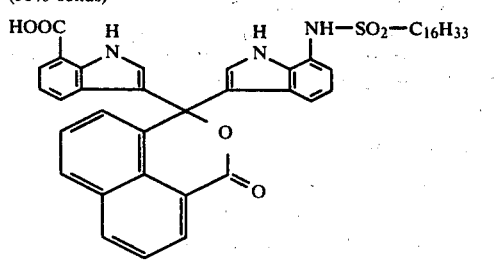 | 14.0 " |

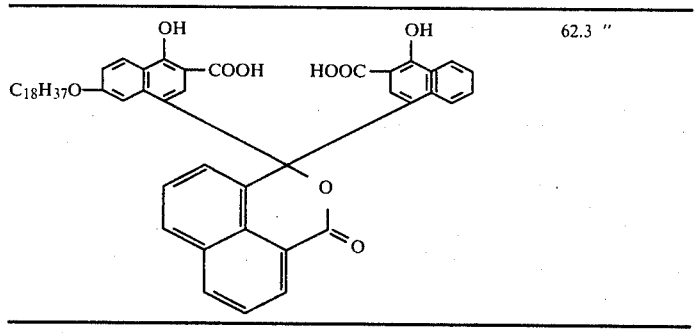

62.3 "

The film units were exposed (½ meter-candle-second) on a sensitometer to a test exposure scale with white light and then processed by passing them through a pair of rollers at a gap spacing of about 0.0030 inch. The film units were kept intact and viewed through the base of the image receiving elements. The reflection densities of the neutral area of the image are listed below.

| Film Unit | | RED | GREEN | BLUE |
|---|---|---|---|---|
| A | $D_{max}$ | 2.25 | 2.45 | 2.09 |
| | $D_{min}$ | 0.19 | 0.20 | 0.26 |
| | $D_{max}$ | 2.26 | 1.39 | 1.99 |
| B | $D_{min}$ | 0.19 | 0.20 | 0.26 |

It is apparent that the green maximum density for Film Unit A was much greater than the green maximum density for Film Unit B.

Figure 3:
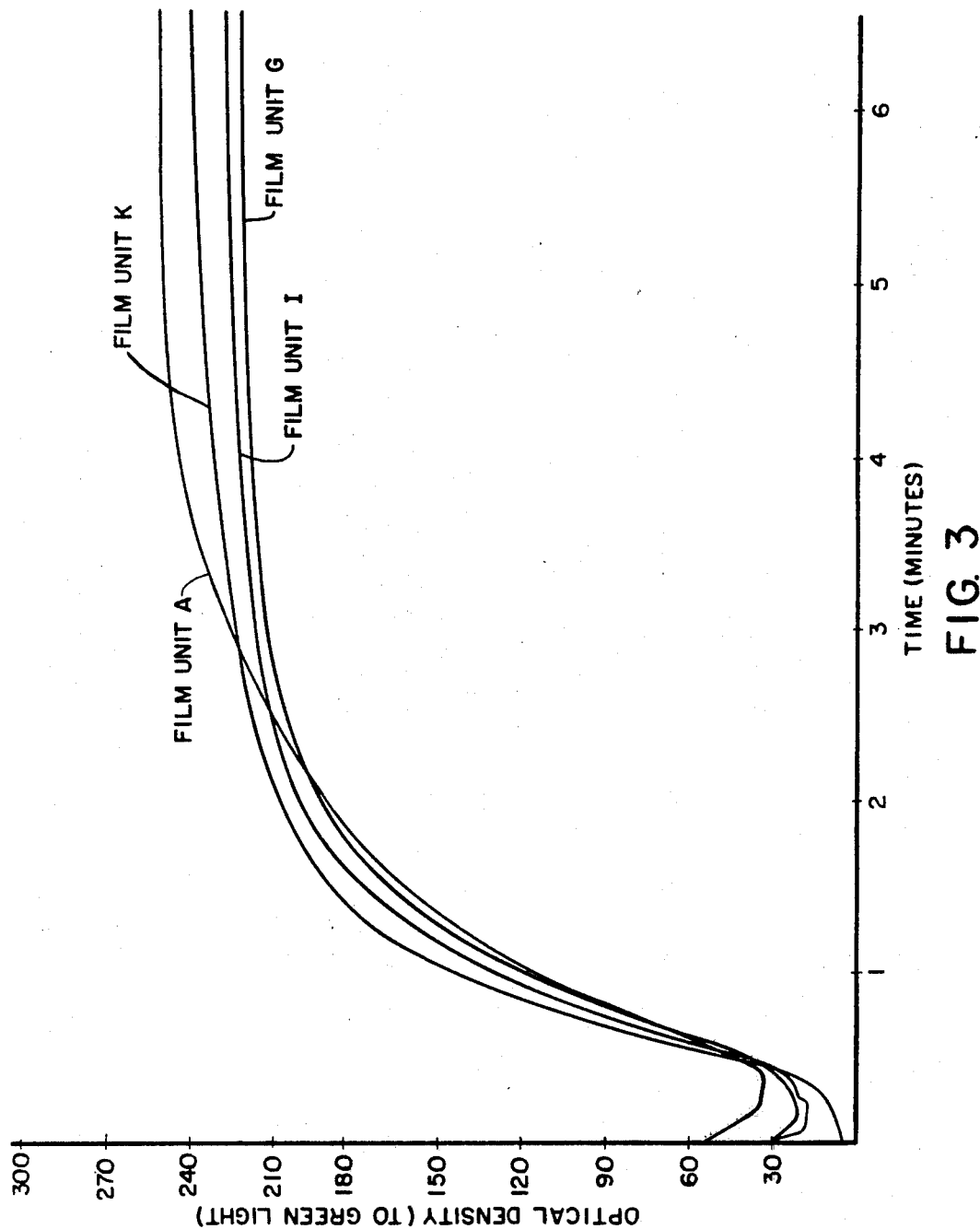
FIG. 3 illustrates the dye transfer rate vs time curves for a magenta dye developer of the present invention when used in various diffusion transfer photographic systems.

The dye transfer rates of magenta dye developer III and V in Film Units A and B also were measured. Two film units, identical to Film Units A and B respectively, were processed, without being exposed, in the manner described above and the optical density to green light (a function of the amount of magenta dye developer transferred to the image-receiving element measured as a function of time on a densitometer connected to a recording unit. The dye transfer curve for Film Unit A is shown in FIG. 3 and that for Film Unit B in FIG. 4. It is apparent that the rate of magenta dye density buildup for Film Unit A is significantly faster than that for Film Unit B.

EXAMPLE IX

This example repeats the experiment described in Example VIII with the exception that the processing composition did not include any phthalein opacifying dyes.

Two film units, A' and B', having the same negative and positive elements as Film Units A and B respectively, were prepared and processed in the same manner described in Example VIII with the exception, as noted above, that the processing composition did not contain the opacifying dyes and the film units were kept in the dark for a period of about five minutes after the processing composition was applied between the positive and negative elements. The reflection densities of the neutral area of the images were:

| Film Unit | | RED | GREEN | BLUE |
|---|---|---|---|---|
| A' | $D_{max}$ | 1.87 | 2.36 | 2.18 |
| | $D_{min}$ | 0.12 | 0.16 | 0.24 |
| | $D_{max}$ | 1.82 | 1.88 | 2.12 |

| Film Unit | | RED | GREEN | BLUE |
|---|---|---|---|---|
| B' | $D_{min}$ | 0.12 | 0.15 | 0.26 |

It can be seen that the green maximum density for Film Unit A' was about the same as that for Film Unit A in Example VIII whereas the green maximum density for Film Unit B' was considerably higher than that for Film Unit B where the opacifying dyes were present. Nevertheless, even in the absence of the opacifying dyes, in this particular diffusion transfer photographic system the green maximum density for Film Unit A' was considerably higher than the green maximum density for Film Unit B'.

EXAMPLE X

The experiment described in Example VIII was repeated with Film Units C and D which were identical to Film Units A and B respectively with the exception that the negative elements of Film Units C and D were initially treated with phenylmercaptotetrazole (PMT) to deactivate the silver prior to processing and were not photosensitive prior to processing.

A solution of 40 g. of potassium hydroxide in water was prepared and acetic acid was added to bring the pH to 7.0. Water was added to bring the solution to a volume of 1 liter and 2% by weight of PMT dissolved in the solution.

The negative elements were immersed in the solution for about two minutes and then allowed to air dry under ambient conditions. The reflection densities of the images obtained from Film Units C and D were:

| Film Unit | | RED | GREEN | BLUE |
|---|---|---|---|---|
| C | $D_{max}$ | 2.40 | 2.70 | 2.62 |
| D | $D_{max}$ | 2.45 | 1.95 | 2.60 |

It is apparent that the green maximum density for Film Unit C is significantly higher than that of Film Unit D.

EXAMPLE XI

The experiment described in Example IX was repeated with the exception that the film units were initially treated with PMT (as described in Example X). The reflection densities of the images were:

| Film Unit | | RED | GREEN | BLUE |
|---|---|---|---|---|
| C' | $D_{max}$ | 2.05 | 2.55 | 2.55 |

| Film Unit | | RED | GREEN | BLUE |
|---|---|---|---|---|
| D' | $D_{max}$ | 2.10 | 2.30 | 2.55 |

It can be seen from this experiment that the green maximum density for Film Unit C' was only slightly higher than that from Film Unit D'. Also, by comparing the results obtained in Examples X and XI it is evident that in the case of dye developer V, the final green density obtained in the absence of the phthalein opacifying dyes in the processing composition (Film Unit D') was higher than that obtained when the opacifying dyes were present (Film Unit D).

EXAMPLE XII

This experiment was carried out with diffusion transfer film units wherein the negative and positive elements are separated from each other after photographic processing.

The film units E and F respectively, included negative elements identical to those described in Example VIII. The positive element of the film units comprised a polyethylene coated paper substrate with the following layers coated thereon in succession, said layers comprising the following major ingredients:

1. a mixture of about 9 parts of a partial butyl ester of polyethylene/maleic anhydride and about 1 part by weight of polyvinylbutyral (Butvar, Shawinigan Products, New York, N.Y.) with a minor amount of titanium dioxide coated at a layer coverage of about 1700 mgs./ft.$^2$ (18,299 mgs./m$^2$);
2. a timing layer coated at a coverage of about 660 mgs./ft.$^2$ (7104 mgs./m$^2$) and comprising 1.7 parts of hydroxypropyl cellulose (Klucel S-97, Hercules, Inc., Wilmington, Del.) and about 1 part of polyvinyl alcohol;
3. an image-receiving layer coated at a coverage of about 770 mgs./ft$^2$ (8288 mgs./m$^2$) and comprising about 1 part of poly-4-vinylpyridine, 2 parts of polyvinyl alcohol, a minor amount of hexahydro-4,5-trimethylene pyrimidine-2-thione as a development restraining reagent and hardened by a condensate of acrolein and formaldehyde; and
4. a topcoat layer coated at a coverage of about 24 mgs./ft$^2$ (258 mgs./m$^2$) comprising about 2.1 parts of ammonium hydroxide (28%) and about 1 part of spray dried gum arabic.

The film units were processed with a processing composition comprised of

| | Weight percent. |
|---|---|
| Water | 85.65 |
| Carboxymethyl hydroxyethyl cellulose | 2.60 |
| Potassium hydroxide | 6.93 |
| N-phenethyl-α-picolinium bromide | 1.62 |
| N-benzyl-α-picolinium bromide | 0.43 |
| Benzotriazole | 1.53 |
| 6-methyl uracil | 0.42 |
| 6-bromo-5-methyl-4-azobenzimidazole | 0.13 |
| 4-Aminopyrazolo(3,4d)pyrimidine | 0.08 |
| Zinc nitrate | 0.44 |
| 3,5-dimethyl pyrazole | 0.17 |

After an imbibition period of one minute the negative and positive elements were stripped from each other and the reflection densities of the neutral area of the positive images were read on a densitometer.

| Film Unit | | RED | GREEN | BLUE |
|---|---|---|---|---|
| E | $D_{max}$ | 1.10 | 2.18 | 2.24 |
| | $D_{min}$ | 0.13 | 0.13 | 0.17 |
| F | $D_{max}$ | 1.04 | 1.59 | 2.27 |
| | $D_{min}$ | 0.14 | 0.14 | 0.17 |

EXAMPLE XIII

The experiment of Example XII was repeated with the exception that the imbibition period, after processing, was three minutes. The reflection densities of the neutral area of the positive images were:

| Film Unit | | RED | GREEN | BLUE |
|---|---|---|---|---|
| E' | $D_{max}$ | 1.48 | 2.28 | 2.16 |
| | $D_{min}$ | 0.12 | 0.12 | 0.14 |
| F' | $D_{max}$ | 1.39 | 1.68 | 2.07 |
| | $D_{min}$ | 0.12 | 0.11 | 0.15 |

It is evident that in both Examples XII and XIII the film units which included dye developer III (E and E') had considerably higher green miximum densities than the film units which included dye developer V (F and F').

EXAMPLES XIV-XVI

These examples describe a series of experiments conducted with a diffusion transfer photographic system wherein the film unit did not include a polymeric acid layer or a timing layer in order to determine the effect, upon the transfer of the dye developers, of not lowering the pH of the system during development.

The negative elements used in the film units were the same as those used in Film Units A and B respectively.

The positive element used comprised a transparent subcoated polyethylene terephthalate film based on which the following layers were coated in succession:
1. a polymeric image-receiving layer coated at a coverage of about 5 mgs./ft$^2$ (53.8 mgs./m$^2$) of 1,4-butanediol diglycidyl ether and about 300 mgs./ft$^2$ (3229 mgs./m$^2$) of: (a) 3 parts of a mixture of 2 parts polyvinyl alcohol and 1 part poly-4-vinylpyridine and (b) 1 part of a graft copolymer comprised of 4-vinylpyridine (4VP) and vinylbenzyl trimethylammonium chloride (TMQ) grafted onto hydroxyethyl cellulose (HEC) at a ratio HEC/4VP/TMQ of 2.2:2.2:1; and
2. a layer coated at a coverage of about 100 mg./ft$^2$ (1076 mgs./m$^2$) and comprising 1 part of a tetrapolymer of equal amounts of methacrylic acid and diacetone acrylamide with small amounts of butyl acrylate and styrene, 0.75 part of Igepal ® CO 890, a nonylphenoxyethylene oxide ethanol surfactant from General Dyestuff Co. and 0.35 part of polyvinyl pyrrolidone.

In each Example the film units were processed, without being exposed, in the manner described in Example VIII and the optical density to green light measured as a function of time on a densitometer connected to a recording unit.

EXAMPLE XIV

Figure 4:
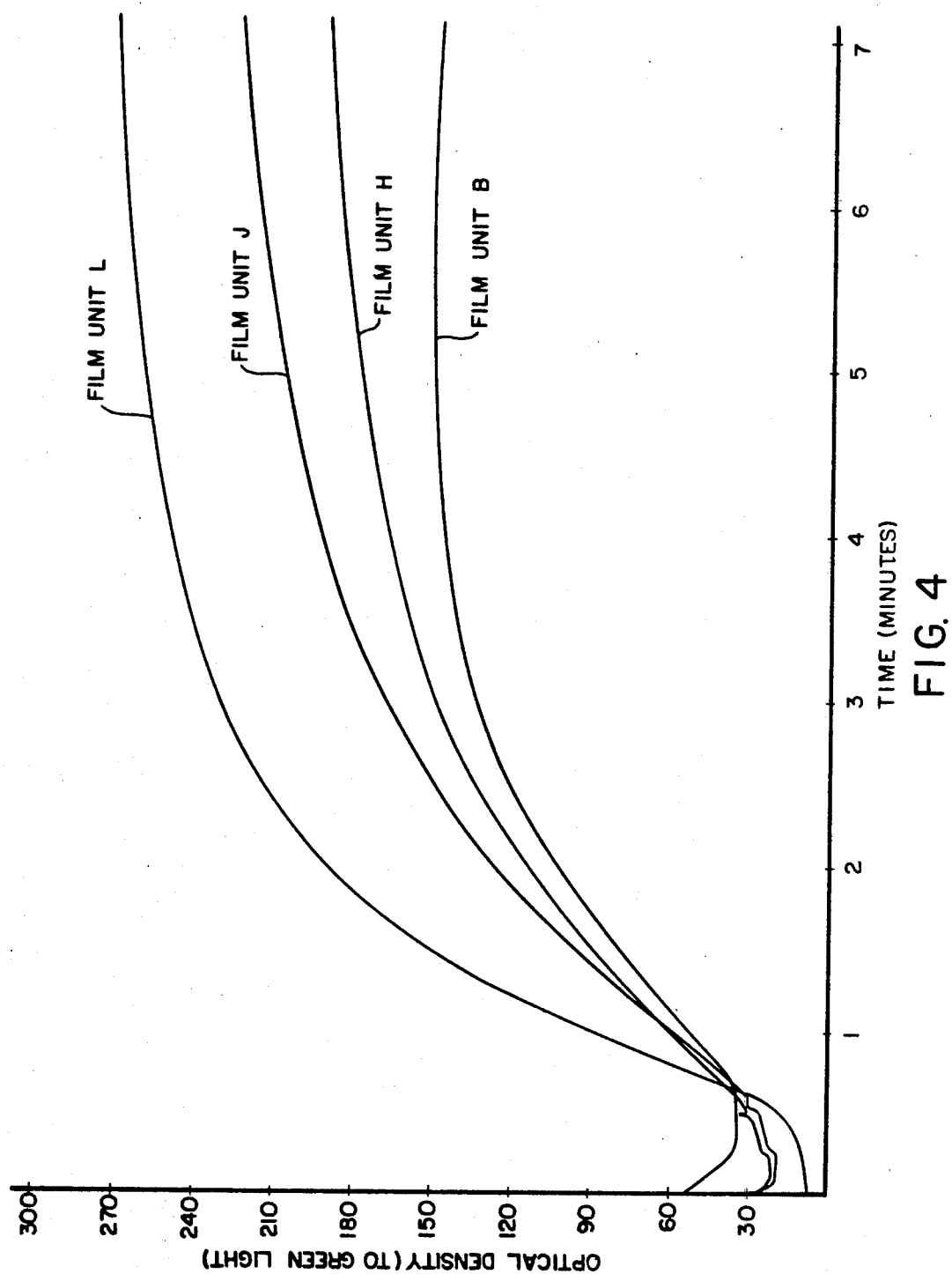
FIG. 4 illustrates the dye transfer rate vs time curves for a magenta dye developer disclosed in a copending application when used in various diffusion transfer photographic systems.

Film Units G and H (which included dye developer III and V respectively) were processed as described using the processing composition described in Example VIII. The dye transfer curve for Film Unit G is shown in FIG. 3 and that for Film Unit H is shown in FIG. 4.

EXAMPLE XV

Film Units I and J (which included dye developer III and V respectively) were processed as described using the processing composition described in Example VIII after having been treated with PMT as described in Example X. The dye transfer curve for Film Unit I is shown in FIG. 3 and that for Film Unit J is shown in FIG. 4.

EXAMPLE XVI

Film Units K and L (which included dye developer III and V respectively) were processed as described above using the processing composition described in Example IX after having been treated with PMT as described in Example X. The dye transfer curve for Film Unit K is shown in FIG. 3 and that for Film Unit L is shown in FIG. 4.

Although the invention has been described with respect to specific preferred embodiments, it is not intended to be limited thereto but rather those skilled in the art will recognize that variations and modifications may be made therein which are within the spirit of the invention and the scope of the appended claims.

What is claimed is:

1. A photographic film product which comprises a support carrying a cyan dye developer layer in association with a red sensitive gelatino silver halide emulsion layer, a magenta dye developer layer comprising a compound which is represented by the structural formula

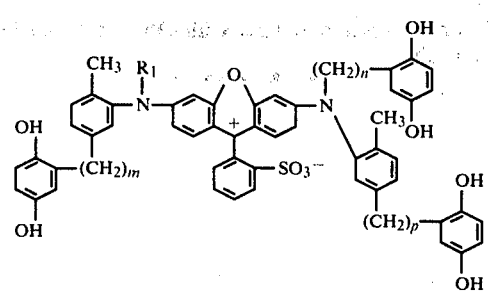

wherein $R_1$ is $CH_3$ or

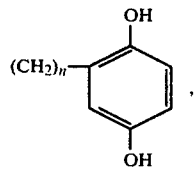

m, n and p may be the same or different and each is an integer of from 1 to 5 in association with a green sensitive gelatino silver halide emulsion layer and a yellow dye developer layer in association with a blue sensitive gelatino silver halide emulsion layer.

2. A film product as defined in claim 1 wherein $R_1$ is $CH_3$.

3. A film product as defined in claim 2 wherein m, n and p are each 3.

4. A film product as defined in claim 1 wherein m, n and p are each 3.

5. A photographic film unit comprising a first support and a second support, at least one of said supports being transparent; a plurality of layers including a red sensitive gelatino silver halide emulsion layer associated with a cyan dye developer layer, a green sensitive gelatino silver halide emulsion layer associated with a magenta dye developer layer, and a blue sensitive gelatino silver halide emulsion layer associated with a yellow dye developer layer carried on one of said supports; an image receiving layer carried on one of said supports; a rupturable container releasably holding a processing composition adapted, when distributed between a pair of predetermined layers carried by said supports, to develop said silver halide emulsion layers and provide a diffusion transfer image in said image receiving layer; means providing a white light-reflecting layer between said image receiving layer and said silver halide emulsion layers to mask said silver halide emulsion layers after development thereof and to provide a white background for a diffusion transfer image formed in said image receiving layer, said diffusion transfer image being viewable through said transparent support; said supports and the layers carried thereon being held in fixed relationship with said silver halide emulsion layers being photoexposable through a transparent support, said magenta dye developer layer comprising a compound which is represented by the structural formula:

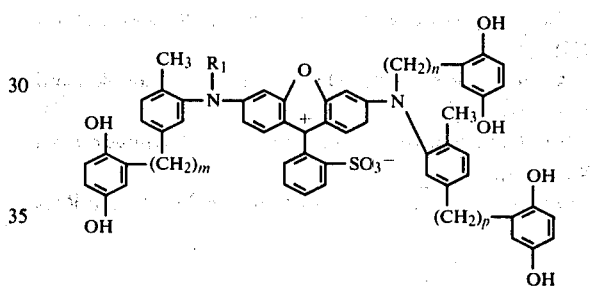

wherein $R_1$ is $CH_3$ or

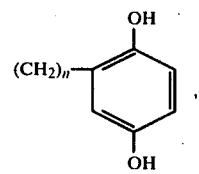

m, n and p may be the same or different and each is an integer of from 1 to 5.

6. A film unit as defined in claim 5 wherein said image-receiving layer is carried by said transparent support, said processing composition includes a white pigment and said rupturable container is so positioned as to distribute its contents between said image receiving layer and said silver halide emulsion layers.

7. A film unit as defined in claim 5 wherein both said supports are transparent, said image-receiving layer and said silver halide emulsion layers are carried by the same support with a layer of white pigment therebetween and said rupturable container is so positioned as to distribute its contents between said silver halide emulsion layers and the transparent support through which photoexposure is effected.

8. A film unit as defined in claim 5 wherein $R_1$ is $CH_3$.

9. A film unit as defined in claim 8 wherein m, n and p are each 3.

10. A film unit as defined in claim 5 wherein m, n and p are each 3.

11. A multicolor diffusion transfer photographic process which comprises imagewise exposing a photosensitive element comprising a blue sensitive gelatino silver halide emulsion layer having a yellow dye developer layer associated therewith, a green sensitive gelatino silver halide emulsion layer having a magenta dye developer layer associated therewith and a red-sensitive gelatino silver halide emulsion layer having a cyan dye developer layer associated therewith and applying an aqueous alkaline processing composition to said exposed photosensitive element to effect development and to form an imagewise distribution of unoxidized dye developer in undeveloped areas of each of said silver halide emulsions as a function of said development, said process including the step of transferring at least a portion of said imagewise distributions of unoxidized dye developers to an image receiving layer in superposed relationship therewith to thereby provide a multicolor diffusion transfer image, said magenta dye developer layer including a dye developer as defined in claim 1.

12. The process as defined in claim 10 wherein $R_1$ is $CH_3$.

13. A process as defined in claim 12 wherein m, n and p are each 3.

14. The process as defined in claim 11 wherein m, n and p are each 3.

15. A film product as defined in claim 1 wherein $R_1$ is

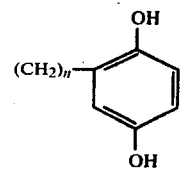

16. A film product as defined in claim 15 wherein m, n and p are each 3.

17. A film unit as defined in claim 5 wherein $R_1$ is

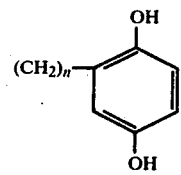

18. A film unit as defined in claim 17 wherein m, n and p are each 3.

19. A process as defined in claim 11 wherein $R_1$ is

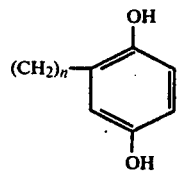

20. A process as defined in claim 19 wherein m, n and p are each 3.